United States Patent
Nakamura

(10) Patent No.: US 11,608,676 B2
(45) Date of Patent: Mar. 21, 2023

(54) OUTER WALL MATERIAL AND METHOD FOR MANUFACTURING SAME

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 77 days.

(21) Appl. No.: 17/084,534

(22) Filed: Oct. 29, 2020

(65) Prior Publication Data
US 2021/0047883 A1 Feb. 18, 2021

Related U.S. Application Data

(63) Continuation of application No. PCT/JP2019/015712, filed on Apr. 10, 2019.

(30) Foreign Application Priority Data

May 9, 2018 (JP) .............................. JP2018-090332

(51) Int. Cl.
| | |
|---|---|
| *C03B 23/24* | (2006.01) |
| *E06B 9/24* | (2006.01) |
| *C03B 23/00* | (2006.01) |
| *C03C 17/00* | (2006.01) |
| *E04B 1/78* | (2006.01) |

(52) U.S. Cl.
CPC ................ *E06B 9/24* (2013.01); *C03B 23/00* (2013.01); *C03C 17/001* (2013.01); *E04B 1/78* (2013.01); *C03B 23/24* (2013.01); *E06B 2009/2417* (2013.01); *E06B 2009/2482* (2013.01)

(58) Field of Classification Search
CPC .. C03B 23/006; C03B 23/06–10; C03B 23/24
See application file for complete search history.

(56) References Cited

U.S. PATENT DOCUMENTS

| | | | | |
|---|---|---|---|---|
| 2,105,174 | A | * | 1/1938 | Zimmerman ............ C03B 23/24 65/58 |
| 2,149,246 | A | * | 2/1939 | Zimmerman ............ C03B 23/24 65/41 |
| 2,170,602 | A | * | 8/1939 | Bauer ...................... C03B 23/24 65/41 |

(Continued)

FOREIGN PATENT DOCUMENTS

| | | |
|---|---|---|
| CN | 105155739 A | 12/2015 |
| JP | S56-175955 U | 12/1981 |

(Continued)

*Primary Examiner* — Cynthia Szewczyk
(74) *Attorney, Agent, or Firm* — Kenealy Vaidya LLP

(57) ABSTRACT

An outer wall material includes a first transparent member integrally or separately including a transparent plate material and a prism portion; and a reflection member provided on a second side of the prism portion of the first transparent member. The prism portion causes the reflection member to collect light whose angle with respect to a normal line of the plate material is equal to or greater than a predetermined angle and to retro-reflect the collected light, and transmits light whose angle with respect to the normal line of the plate material is less than the predetermined angle.

2 Claims, 10 Drawing Sheets

(56) References Cited

U.S. PATENT DOCUMENTS

| | | | | |
|---|---|---|---|---|
| 2,290,088 | A | * | 7/1942 | Bleakley ................ C03B 23/24 65/58 |
| 2,297,337 | A | * | 9/1942 | Wiley ..................... C03B 23/24 65/44 |
| 4,052,688 | A | | 10/1977 | DeNigris et al. |
| 4,071,290 | A | | 1/1978 | DeNigris et al. |
| 5,461,496 | A | | 10/1995 | Kanada et al. |
| 5,650,875 | A | | 7/1997 | Kanada et al. |
| 2011/0310473 | A1 | | 12/2011 | Yoshida et al. |
| 2012/0092756 | A1 | | 4/2012 | Yoshida et al. |
| 2014/0233104 | A1 | | 8/2014 | Nagahama et al. |

FOREIGN PATENT DOCUMENTS

| | | |
|---|---|---|
| JP | 57-175955 U | 11/1982 |
| JP | S59-35749 A | 2/1984 |
| JP | 3-9339 Y2 | 3/1996 |
| JP | 2003-202159 A | 7/2003 |
| JP | 3491895 B2 | 1/2004 |
| JP | 2011-2819 A | 1/2011 |
| JP | 2012-3025 A | 1/2012 |
| JP | 2012-242508 A | 12/2012 |
| JP | 2012-242509 A | 12/2012 |
| JP | 2014-222359 A | 11/2014 |
| JP | 2015-045774 A | 3/2015 |
| JP | 5946805 B2 | 7/2016 |
| WO | 2013/018682 A1 | 3/2015 |

* cited by examiner

OUTER WALL MATERIAL AND METHOD FOR MANUFACTURING SAME

CROSS-REFERENCE TO RELATED APPLICATIONS

This is a continuation of International Application No. PCT/JP2019/015712 filed on Apr. 10, 2019, and claims priority from Japanese Patent Application No. 2018-090332, filed on May 9, 2018, the entire content of which is incorporated herein by reference.

TECHNICAL FIELD

This disclosure relates to an outer wall material and a method for manufacturing same.

BACKGROUND ART

In a related art, proposed is an outer wall material that retro-reflects direct light from the sun to the sun side (for example, refer to JP-A-2012-003025, JP-A-2011-002819. JP-A-2013-018682, JP-A-2012-242509, JP-A-2012-242508).

Here, the inventor of the present invention investigates to make an outer wall material hardly heated by retro-reflecting direct light in the summer such that deterioration in cooling efficiency can be suppressed, and to make it possible that the direct light be used for heating without retro-reflecting the direct light in the winter. In this point, the inventor of the present invention assumes that, for example, when a user performs some operation on the outer wall material, the outer wall material can be switched between a state in which the direct light is retro-reflected and a state in which the direct light is not retro-reflected.

However, when the switching between the state in which the direct light is retro-reflected and the state in which the direct light is not retro-reflected is performed by a user operation, the switching between the states cannot be performed unless an environment where the user operation can be performed is allowed. For example, the inventor of the present invention assumes that the state is switched by performing a reversing operation of the outer wall material or by performing a switch operation, but in some cases, the operation cannot be easily performed when the reversing operation and the switch operation cannot be performed due to the presence of a rain pipe to be mounted on the outer wall material.

SUMMARY OF INVENTION

Aspect of non-limiting embodiments of the present disclosure relates to provide an outer wall material capable of being switched between a state in which direct light in the summer is retro-reflected and a state in which direct light in the winter is not retro-reflected without requiring a user operation. Another aspect of the embodiments relates to provide a method for manufacturing same.

According to an aspect of the present disclosure, there is provided an outer wall material including a transparent member and a reflection member. The transparent member integrally or separately includes a transparent plate material and a prism portion, and the reflection member is provided on a predetermined surface of the prism portion of the transparent member. The prism portion causes the reflection member to collect light whose angle with respect to a normal line of the plate material is equal to or greater than a predetermined angle and to retro-reflect the collected light, and transmits light whose angle with respect to the normal line of the plate material is less than the predetermined angle.

According to another aspect of the present disclosure, there is provided a method for manufacturing the outer wall material according to the present disclosure in which first and second bottomed containers are maintained at a temperature exceeding an annealing point from a step of forming the first and second bottomed containers by molding a softened glass material to a step of combining and integrating open sides of the first and second bottomed containers, and thereafter, the temperature thereof is lowered to a room temperature.

BRIEF DESCRIPTION OF DRAWINGS

FIGS. 11A and 11B are configuration diagrams illustrating a prism portion used for an outer wall material according to a fifth embodiment, in which FIG. 11A illustrates a perspective view and FIG. 11B illustrates a side view.

FIGS. 13A to 13C are perspective views illustrating modifications of the prism portion illustrated in FIGS. 11A and 11B, in which FIG. 13A illustrates a first modification. FIG. 13B illustrates a second modification, and FIG. 13C illustrates a third modification.

DESCRIPTION OF EMBODIMENTS

Hereinafter, the present invention will be described according to appropriate embodiments. The present invention is not limited to the embodiments described below, and can be appropriately modified within the scope not departing from the spirit of the present invention. In the embodiments described below, there is a portion in which illustration and description of a part of the configuration are omitted, and with respect to details of an omitted technology, it goes without saying that a publicly-known or a well-known technology is appropriately applied within the scope where contradiction with a content described below does not occur.

Figure 1:
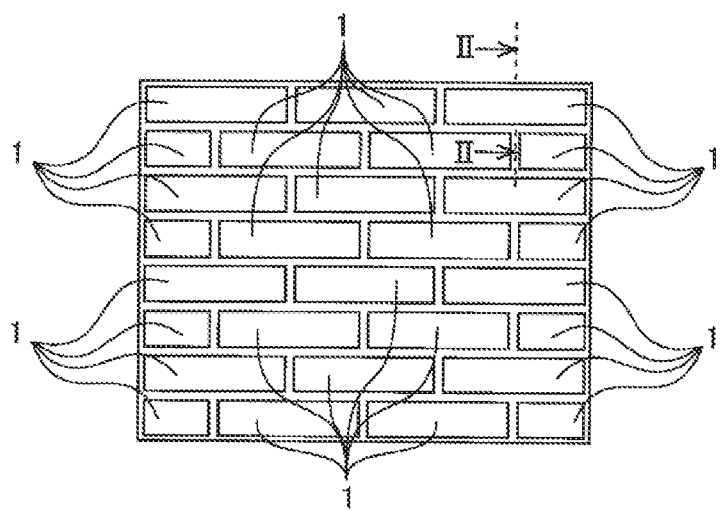
FIG. 1 is a front view illustrating an outer wall material according to a first embodiment.
Figure 2:
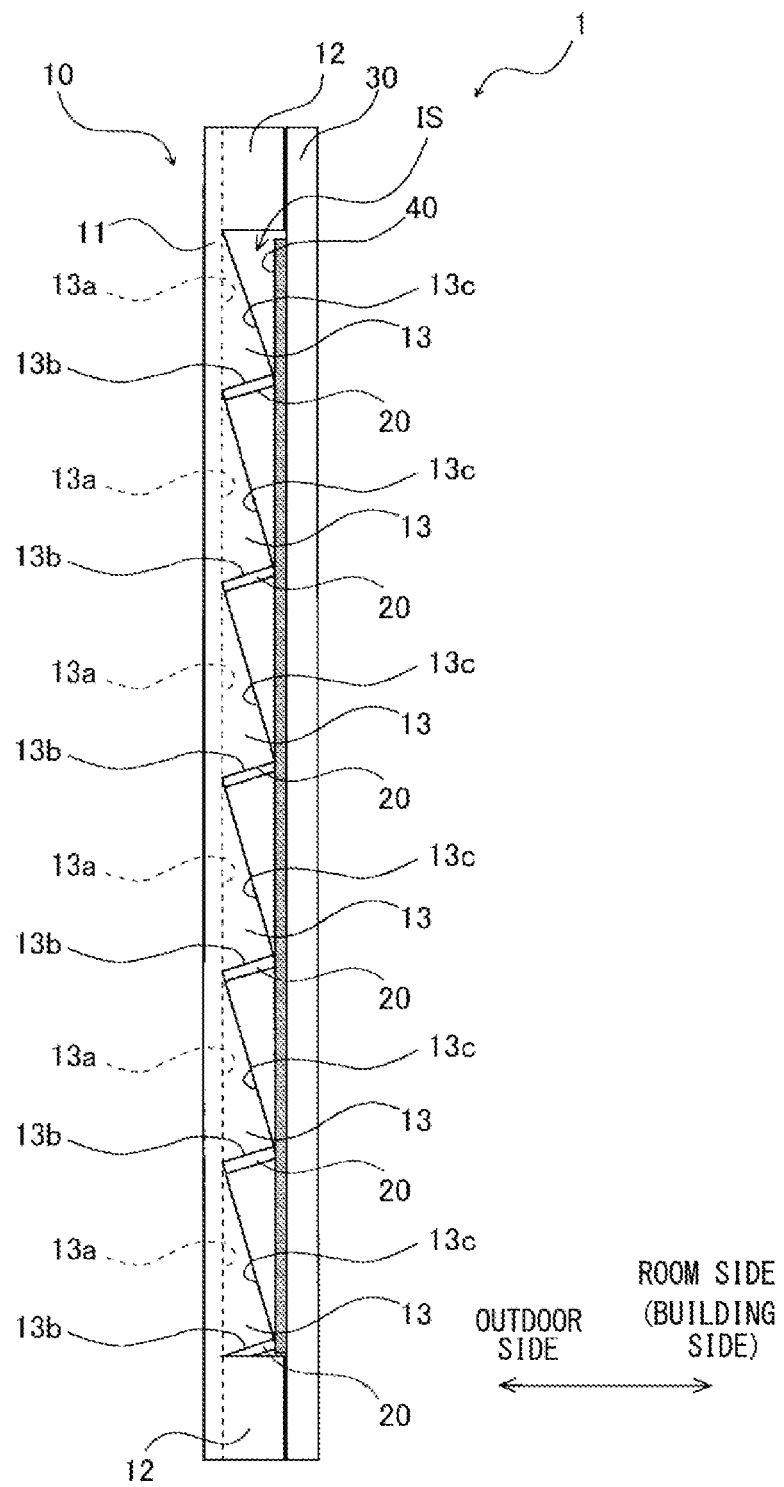
FIG. 2 is a cross-sectional view taken along the line II-II illustrating the outer wall material illustrated in FIG. 1.

FIG. 1 is a front view illustrating an outer wall material according to a first embodiment, and FIG. 2 is a cross-sectional view taken along the line II-II illustrating the outer wall material illustrated in FIG. 1. As illustrated in FIG. 1, for example, an outer wall material 1 is formed as a tile that is embedded in a mortar material (an example of a wall surface on which the outer wall material 1 is to be attached) or stuck to a wall surface (an example of a wall surface on which the outer wall material 1 is to be attached) with an adhesive. A plurality of tiles (the outer wall material 1) are regularly arranged.

In the embodiment, the plurality of outer wall materials 1 are arranged in a running bond pattern, but are not particularly limited thereto and may be arranged in a herringbone pattern and a half basket weave pattern. An arrangement form thereof is not particularly limited.

Each outer wall material 1 retro-reflects direct light when a sun altitude in the summer is high, and uses direct light when the sun altitude in the winter is low for heating. As illustrated in FIG. 2, each outer wall material 1 includes a first transparent member (transparent member) 10, a reflection member 20, a second transparent member 30, and a heat absorbing member 40.

The first transparent member 10 is formed of a transparent material such as a glass material or a resin material, and includes a flat-shaped plate material 11, an end wall 12, and a prism portion 13 having a triangular cross section.

The flat-shaped plate material 11 is an outdoor side surface member of the outer wall material 1. The end wall 12 is a wall material orthogonal to the plate material 11, and is provided at a peripheral end portion of the plate material 11. The end wall 12 is provided integrally with the plate material 11 on a room side surface of the plate material 11. The first transparent member 10 has a bottomed quadrangular cylindrical shape in which the plate material 11 serves as a bottom wall and the end wall 12 servers as a side wall.

The prism portion 13 is arranged inside the bottomed quadrangular cylindrical shape (room side of the plate material 11), and is formed with prisms respectively having a triangular shape in a cross sectional view (that is, a prism having a triangular prism shape). In these prism portions 13, a first side 13a is integrated with the plate material 11. A second side 13b and a third side 13c of the prism portion 13 extend at a predetermined angle with respect to the first side 13a. The second side 13b is a side located vertically below the third side 13c. The prism portion 13 may be separated from the plate material 11, and the first side 13a may be separated from the plate material 11.

The reflection member 20 is a member that reflects sunlight and, for example, is a member in which reflectance of visible light and infrared light is 70% or higher. The reflection member 20 is provided in a state of being in contact with the second side 13b of the prism portion 13 (predetermined surface). The reflection member 20 may be provided in a state of being separated from the prism portion 13. It is desirable that the reflection member 20 is formed by applying ceramic coating to the second side 13b of the prism portion 13.

The second transparent member 30 is a member that is embedded in a mortar material or stuck to a wall surface, and is a flat-shaped plate material provided on the room side of the first transparent member 10. The second transparent member 30 adheres to the end wall 12 of the first transparent member 10, and the first transparent member 10 is mounted. Therefore, the prism portion 13 and the reflection member 20 are arranged in an internal space IS sandwiched between the first transparent member 10 and the second transparent member 30. For example, when a material forming the outer wall material 1 is a glass material, a frit glass paste having a melting point lower than an annealing point or a strain point of the glass material is used for adhesion. An adhesive capable of performing adhesion at a low temperature may be used for the adhesion. Since the second transparent member 30 is required to have equivalent thermal expansion coefficient and heat resistance as those of the first transparent member 10, it is desirable that the second transparent member 30 is made of the same material as that of the first transparent member 10, but in the embodiment, the material is not necessarily required to be transparent.

The heat absorbing member 40 is a member that absorbs heat from sunlight, and is formed of, for example, a selective absorption film provided on a surface of the outdoor side of the second transparent member 30 by sputtering. In this selective absorption film, for example, absorptivity of the visible light and the infrared light is 70% or higher, and the absorptivity is high in a sunlight wavelength range (0.3 to 2.5 μm), and emissivity is small in an infrared light wavelength range (3.0 to 20 μm). When the second transparent member 30 adheres to the first transparent member 10, the heat absorbing member 40 is formed at a location that fits between the end walls 12, and is arranged in the internal space IS when the first transparent member 10 and the second transparent member 30 are assembled to each other.

Figure 3:
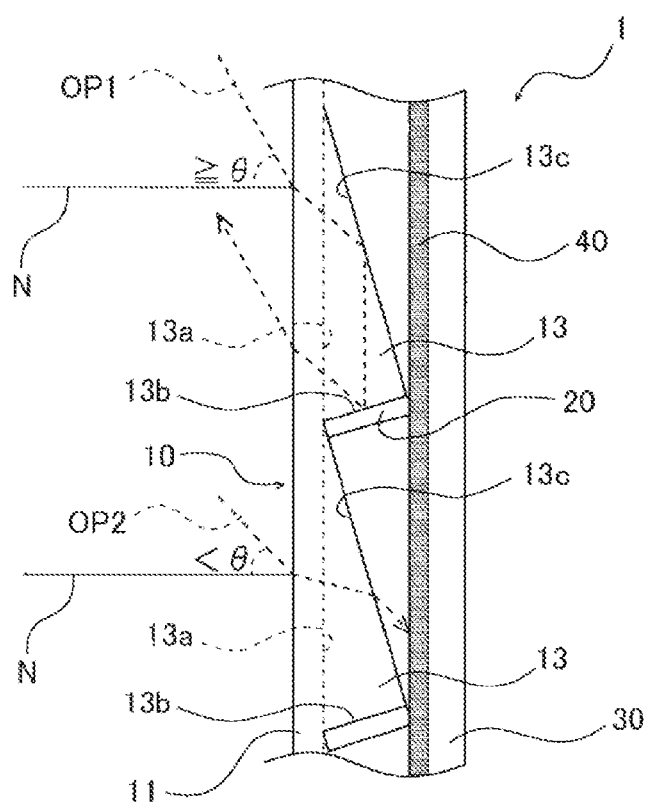
FIG. 3 is a conceptual diagram illustrating an optical path of direct light incident on the outer wall material according to the first embodiment.

FIG. 3 is a conceptual diagram illustrating an optical path of the direct light incident on the outer wall material 1 according to the first embodiment. As illustrated in FIG. 3, in the embodiment, a refractive index and a triangular internal angle of the prism portion 13 are set as follows. That is, the refractive index and the triangular internal angle of the prism portion 13 are set so that direct light OP1 whose angle with respect to a normal line N of the plate material 11 is equal to or greater than a predetermined angle θ (for example, direct light when the sun altitude in the summer is high) is collected on the reflection member 20 and then the collected direct light OP1 is retro-reflected. More specifically, the refractive index and the triangular internal angle of the prism portion 13 are set so that an incident angle of the direct light OP1 on the third side 13c is equal to or greater than a critical angle. When the reflection member 20 is provided to be separated from the second side 13b, the refractive index and the triangular internal angle of the prism portion 13 are set so that an incident angle of the direct light OP1 on the second side 13b is less than the critical angle.

The refractive index and the triangular internal angle of the prism portion 13 are set so that light whose angle with respect to the normal line N is less than the predetermined angle θ (direct light OP2 and light such as reflected light from the ground) is allowed to be transmitted.

The direct light OP1 illustrated in FIG. 3 first reaches the third side 13c of the prism portion 13, and when the refractive index and the triangular internal angle are set as described above, even in the case of direct light that first reaches the second side 13b, the direct light is retro-reflected in the same manner.

Next, an operation of the outer wall material 1 according to the embodiment will be described with reference to FIGS. 1 to 3.

First, it is assumed that the direct light OP1 whose angle with respect to the normal line N is equal to or greater than the predetermined angle θ is incident on the first transparent member 10. At this time, the direct light OP1 is transmitted through the plate material 11 of the first transparent member 10 and reaches the prism portion 13. The direct light OP1 reaching the prism portion 13 includes the following 1) to 3). 1) The direct light OP1 is totally reflected only on the third side 13c and reaches the reflection member 20 provided on the second side 13b. 2) The direct light OP1 is totally reflected on the first side 13a after being totally reflected on the third side 13c, and reaches the reflection member 20 provided on the second side 13b. 3) The direct light OP1 directly reaches the reflection member 20 provided on the second side 13b. All of these lights are retro-reflected by using the reflection at the reflection member 20. That is, the light is emitted from the plate material 11 of the first transparent material 10 toward the sun side.

It is assumed that the direct light OP2 whose angle with respect to the normal line N is less than the predetermined angle θ is incident on the first transparent member 10. At this time, the direct light OP2 is transmitted through the plate material 11 of the first transparent member 10 to reach the prism portion 13, and is transmitted through the prism portion 13 to reach the heat absorbing member 40. Therefore, the direct light OP2 is absorbed by the heat absorbing member 40, and the heat absorbing member 40 heats the wall surface on which the outer wall material 1 is to be attached via the second transparent member 30.

As a result, the outer wall material 1 can retro-reflect the direct light OP1 in the summer, and can achieve a heating effect by using the direct light OP2 in the winter.

Here, it is assumed that the prism portion 13 (the first transparent member 10) has a refractive index of 1.41, and has a right-angled triangle in which an angle formed by the second side 13b and the third side 13c is a right angle in a cross-sectional view. It is assumed that an angle formed by the first side 13a and the third side 13c of the prism portion 13 is 8 degrees. At this time, the predetermined angle θ is set to 58 degrees, the direct light OP1 whose angle with respect to the normal line N is equal to or greater than 58 degrees is retro-reflected, and the direct light OP2 whose angle with respect to the normal line N is less than 58 degrees is used for indoor heating.

Thus, according to the outer wall material 1 of the first embodiment, the prism portion 13 is provided, and the prism portion 13 causes the reflection member 20 to collect the light whose angel is equal to or greater than the predetermined angle θ and to retro-reflect the collected light, and transmits the light whose angle is less than the predetermined angle θ. Therefore, the light when the sun altitude in the summer is high can be retro-reflected by using the reflection member 20, and the light when the sun altitude in the winter is low can be transmitted and can be used for heating. Accordingly, it is possible to provide the outer wall material 1 that can be switched between a state in which the direct light OP1 in the summer is retro-reflected and a state in which the direct light OP2 in the winter is not retro-reflected without requiring a user operation.

Since the wall surface on which the outer wall material 1 is to be attached is heated by using the heat absorbed by the heat absorbing member 40, the heat absorbing member 40 can heat the wall surface by using the light when the sun altitude in the winter is low, and thus the light can be used for heating.

The prism portion 13 is provided in the internal space IS sandwiched between the first transparent member 10 and the second transparent member 30, and the heat absorbing member 40 is formed on a surface of the second transparent member 30 in the internal space IS. Therefore, the prism portion 13 and the heat absorbing member 40 are protected in the internal space IS, thereby making it possible to provide the outer wall material 1 in which a relationship between the prism portion 13 and the heat absorbing member 40 is hard to be broken by an external force, and a long life thereof is achieved.

Next, a second embodiment of the present invention will be described. While an outer wall material according to the second embodiment is similar to that of the first embodiment, some configurations therebetween are different. In the following description, elements that are the same as or similar to those of the first embodiment will be denoted by the same reference signs, and the description thereof will be omitted.

Figure 4:
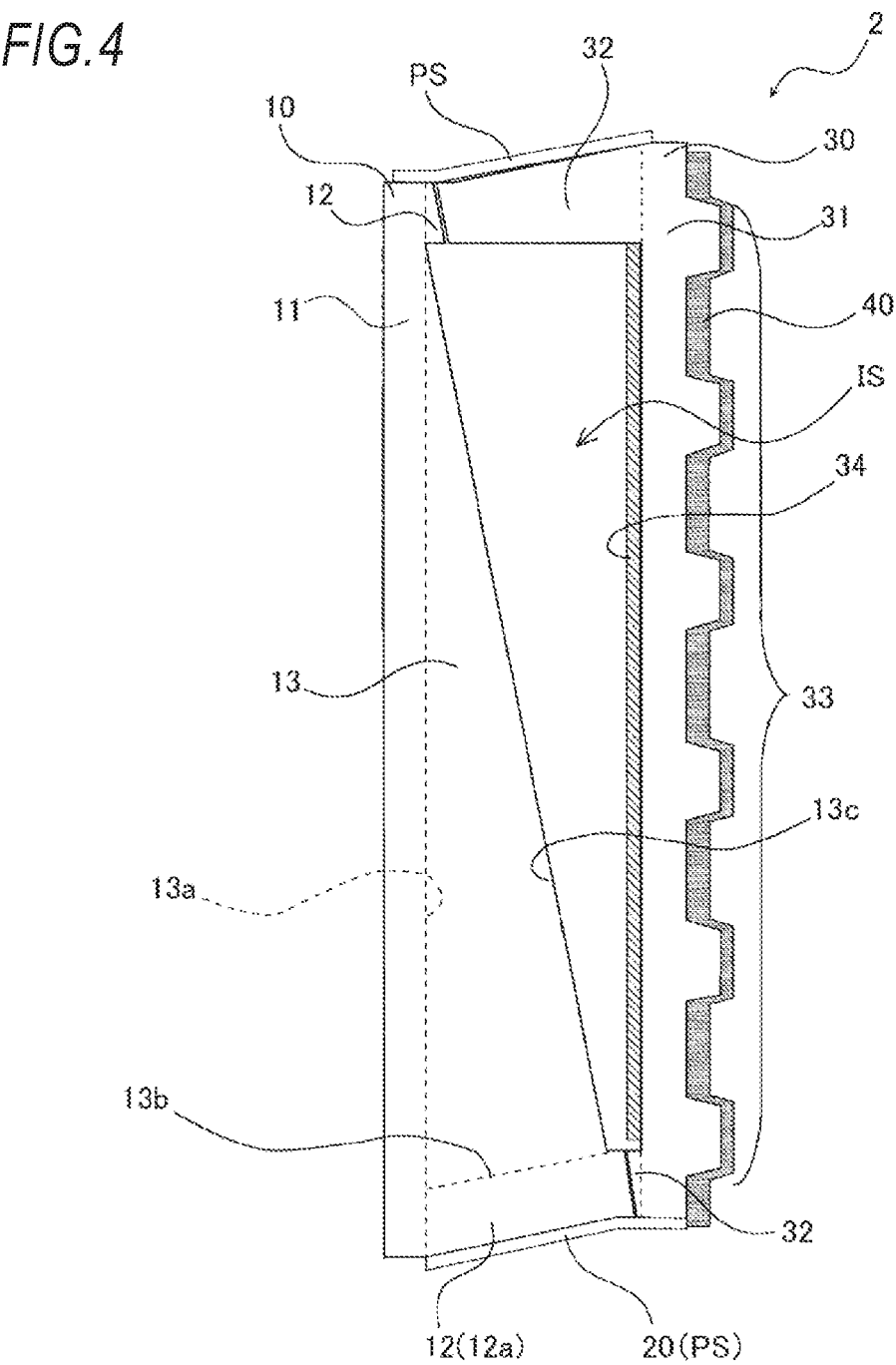
FIG. 4 is a cross-sectional view illustrating an outer wall material according to a second embodiment.

FIG. 4 is a cross-sectional view illustrating the outer wall material according to the second embodiment. An outer wall material 2 illustrated in FIG. 4 includes the first transparent member 10, the reflection member 20, the second transparent member 30, and the heat absorbing member 40 in the same manner as that of the first embodiment. While the outer wall material 2 according to the second embodiment is assumed to be formed of a glass material, the outer wall material 2 is not limited thereto and may be formed of another transparent resin.

The first transparent member 10 includes the plate material 11, the end wall 12, and the prism portion 13. In the prism portion 13 according to the second embodiment, the first side 13a is integrated with the plate material 11, and the second side 13b is also integrated with the end wall 12.

In the second embodiment, the second transparent member 30 includes a flat plate-shaped plate material 31 and an end wall 32. The end wall 32 is a wall material orthogonal to the plate material 31, and is provided at a peripheral end portion of the plate material 31. The end wall 32 is provided integrally with the plate material 31 on an outdoor side surface of the plate material 31.

In the second embodiment, the end walls 12 and 32 of the outer wall material 2 are assembled to each other, thereby forming the internal space IS. In the second embodiment, the internal space IS is in a sealed state, and is in a state of being shielded from an outer space.

The second transparent member 30 includes an uneven portion 33 on the room side (wall surface side) of the plate material 31. By this uneven portion 33, it is possible to improve a holding force of the outer wall material 2 according to the second embodiment with respect to the wall surface. The heat absorbing member 40 according to the second embodiment is formed on the uneven portion 33 (surface on the wall surface side).

In the second embodiment, outer surfaces of the end wall 12 of the first transparent member 10 and the end wall 32 of the second transparent member 30 are coated with a white color or a silver color (vinyl resin coating), thereby forming a coating surface PS.

Particularly, the coating surface PS provided on the end wall 12a on the side integrated with the second side 13b is configured to function as the reflection member 20. The coating is not limited to the white color or the silver color, and the coating is not limited to the white color or the silver color as long as a color allows the reflectance to be higher than that when the coating is not applied.

In the second transparent member 30 according to the second embodiment, a low emission processing (a LowE processing) is performed on a surface on the side of the internal space IS, thereby forming a low emission portion 34. The low emission portion 34 is a portion where emissivity of heat is lower than that of a portion other than the low emission portion 34. The low emission portion 34 is formed by coating a surface of the glass material with a low emissivity characteristic thin film by using, for example, a sputtering method and a chemical vapor deposition (CVD) method. For example, as a main example of the low emission portion 34, there is one in which a thin metal film of silver having a film thickness of approximately 10 nm and a metal oxide film such as $SnO_2$, titanium oxide, and ZnO are added.

The outer wall material 2 described above is manufactured as follows. First, the glass material is heated and softened (a first step). At this time, the glass material is heated to approximately 1500° C. to be sticky substance referred to as a gob.

Next, the glass material softened in the first step is molded to form first and second bottomed containers whose upper portions are open (that is, the first transparent member 10 and the second transparent member 30) that include bottom walls (the plate materials 11 and 31) and side walls (the end walls 12 and 32) (a second step).

In the second step, at the time of molding the first bottomed container (the first transparent member 10), light whose angle with respect to the normal line N of the bottom wall (the plate material 11) is equal to or greater than a predetermined angle θ is collected on the reflection member 20, and the collected light is retro-reflected. The prism portion 13 that transmits light whose angle with respect to the normal line N of the bottom wall (the plate material 11) is less than the predetermined angle θ is formed.

After that, the first and second bottomed containers (the first transparent member 10 and the second transparent member 30) are rapidly cooled to a temperature of approximately 800° C., which is a softening point of the glass material, to shrink, and a shape thereof is stabilized to be released from the mold. At this time, the temperature thereof is maintained so as not to be lowered to a temperature equal to or less than 550° C. to 600° C. which is referred to as an annealing point.

In the second step, the low emission portion 34 is formed on the surface of the side of the internal space IS in a state where the second transparent member 30 is at a temperature of approximately 800° C. by an online CVD method.

Next, the open sides of the first and second bottomed containers (the first transparent member 10 and the second transparent member 30) obtained through the second step are combined and integrated (a third step). In this step, the side walls (the end walls 12 and 32) of the first and second bottomed containers (the first transparent member 10 and the second transparent member 30) are burned to be softened and fused to each other, thereby combining the two side walls thereof. As a result, the internal space IS that is in a sealed state is formed. At this time, hot air is sealed in the internal space IS in the sealed state.

After that, in order to prevent the first and second bottomed containers (the first transparent member 10 and the second transparent member 30) from being broken by rapid cooling, the first and second bottomed containers are cooled up to a room temperature through a process of obtaining thermal stress while keeping the first and second bottomed containers at the annealing point for a certain time.

Next, the reflection member 20 is formed by applying white coating or silver coating to the outer surfaces of the side walls (12 and 32) of the first and second bottomed containers (the first transparent member 10 and the second transparent member 30) that are cooled after integration thereof. Here, in the embodiment, the two side walls (12 and 32) of the first and second bottomed containers (the first transparent member 10 and the second transparent member 30) are coated. However, when only the reflection member 20 is desired to be provided, only the side wall (12) of the first bottomed container (the first transparent member 10) may be coated. The side walls (12 and 32) are not limited to being coated around the whole periphery thereof, but may be coated only on a part thereof.

Here, as described above, the temperature of the first and second bottomed containers (the first transparent member 10 and the second transparent member 30) is maintained above the annealing point in the second step and the third step. The temperature thereof is lowered to the room temperature between the third step and the fourth step. Therefore, in the above-described manufacturing method, once the glass material exceeds the annealing point, thereafter, an operation is performed at the annealing point or higher, and the annealing process is performed from the third step to the fourth step. As a result, the number of times of the heating and annealing process, which takes time and requires energy cost, is reduced, thereby achieving cost reduction.

An optical path and an operation of the outer wall material 2 according to the second embodiment are the same as those of the first embodiment.

As described above, according to the outer wall material 2 of the second embodiment, in the same manner as that of the first embodiment, it is possible to provide the outer wall material 2 that can be switched between the state in which the direct light OP1 in the summer is retro-reflected and the state in which the direct light OP2 in the winter is not retro-reflected without requiring the user operation. The heat absorbing member 40 can heat the wall surface by using the light when the sun altitude in the winter is low, and the light can be used for heating.

According to the second embodiment, the low emission portion 34 is formed on a surface on the side of the internal space IS of the plate material 31 by performing a processing of causing emissivity of heat of the surface to be lower than that of a portion other than the surface. In the second embodiment, the heat absorbing member 40 is formed on the surface on the wall surface side of the plate material 31. Therefore, the heat of the outer wall that is once heated by the heat absorbing member 40 can be made hard to escape.

The reflection member 20 is formed by applying the white coating or the silver coating to the outer surface of the end wall 12 (and the end wall 32). Therefore, for example, the reflection member 20 can be formed from the outside after the first transparent member 10 and the second transparent member 30 are joined to each other without forming the reflection member 20 in the internal space IS, thereby making it possible to easily form the reflection member 20.

According to the method for manufacturing the outer wall material 2 of the second embodiment, in the second step, since the prism portion 13 is formed at the time of molding the first bottomed container, the formation of the prism portion 13 can be easily achieved. In the second step and the third step, the temperature of the first and second bottomed containers is maintained above the annealing point of the glass material. Therefore, once the glass material reaches or exceeds the annealing point, thereafter, the operation is performed at or above the annealing point, and the annealing process is performed from the third step to the fourth step, such that the number of times of the annealing process which takes time is reduced, thereby making it possible to contribute to cost reduction.

Since the internal space IS is in the sealed state when the open sides of the first and second bottomed containers are combined and integrated, the internal space IS that is integrated and sealed under a high temperature environment becomes a low pressure space when the temperature thereof is lowered to the room temperature, whereby a heat insulating layer can be formed in a process of manufacturing the outer wall material 2.

Next, a third embodiment of the present invention will be described. While an outer wall material according to the third embodiment is similar to that of the second embodiment, some configurations therebetween are different. In the following description, elements that are the same as or similar to those of the second embodiment will be denoted by the same reference signs, and the description thereof will be omitted.

Figure 5:
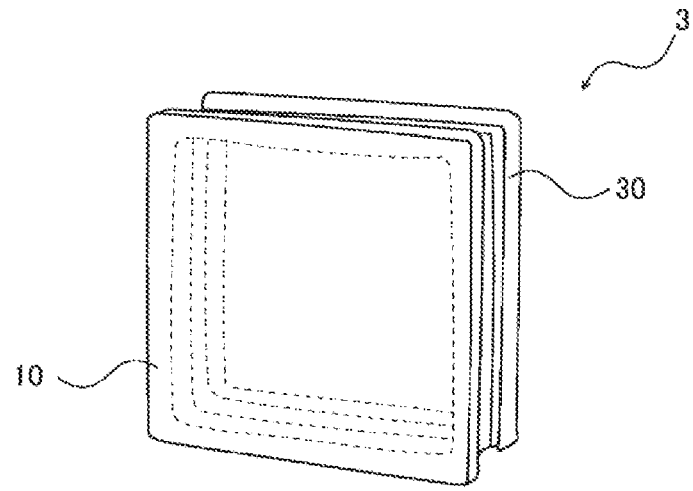
FIG. 5 is a perspective view illustrating an outer wall material according to a third embodiment.
Figure 6:
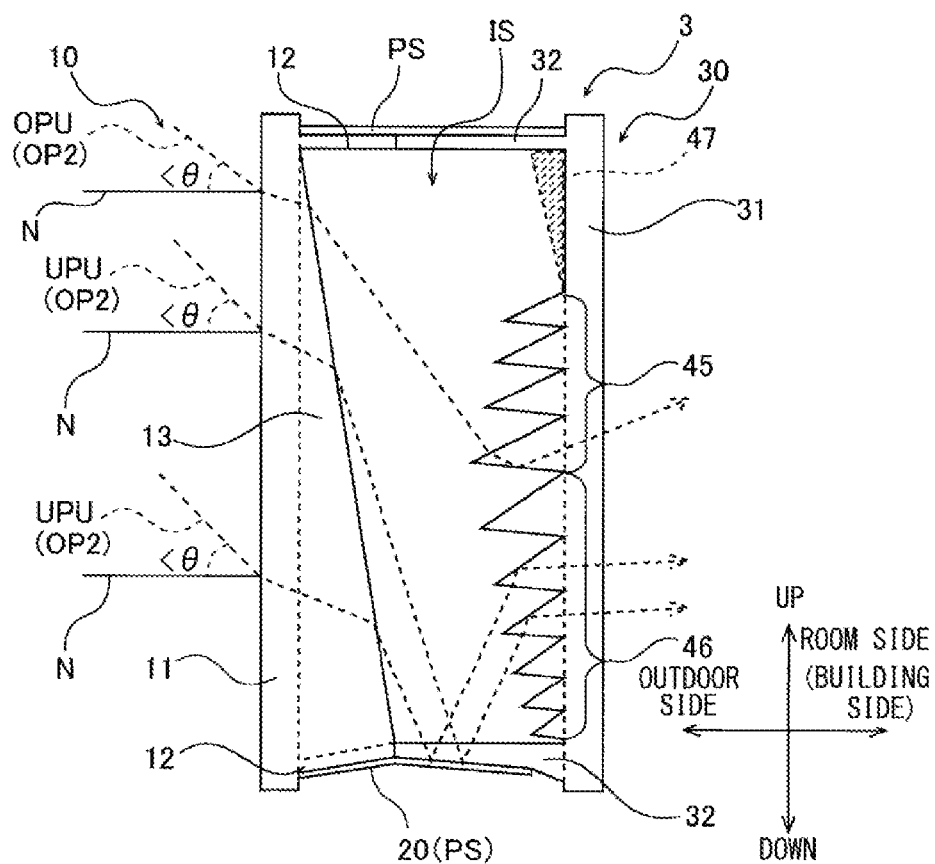
FIG. 6 is a cross-sectional view illustrating the outer wall material according to the third embodiment.

FIG. 5 is a perspective view illustrating the outer wall material according to the third embodiment, and FIG. 6 is a cross-sectional view illustrating the outer wall material according to the third embodiment. In the same manner as that of the outer wall material 2 of the second embodiment, an outer wall material 3 illustrated in FIGS. 5 and 6 includes the first transparent member 10 and the second transparent member 30, and the end walls 12 and 32 thereof are fused to each other. While the outer wall material 2 according to the second embodiment is a tile, the outer wall material 3 according to the third embodiment is used as a so-called glass block. Therefore, the outer wall material 3 according to the third embodiment does not include the heat absorbing member 40, but includes second prism portions 45 and 46 on the side of the internal space IS instead of the heat absorbing member 40.

The second prism portions 45 and 46 are configured with a plurality of triangular prisms formed so as to protrude toward the side of the internal space IS, and are angularly set so as to reflect light transmitted through the prism portion 13 of the first transparent member 10 at an angle equal to or greater than a horizontal angle.

The second prism portions 45 and 46 described above include a plurality (four) of upper prism portions 45 and a plurality (five) of lower prism portions 46. The upper prism portion 45 is located above the lower prism portion 46.

The angle of each upper prism portion 45 is set so as to reflect direct light OPU incident from above, and to emit the reflected direct light OPU from the plate material 31 at an angle equal to or greater than the horizontal angle. In order for the plurality of upper prism portions 45 to desirably reflect the direct light OPU incident from above, the plurality of upper prism portions 45 are formed so that the one located on the upper side has a smaller mountain and the one located on the lower side has a larger mountain.

The angle of each lower prism portion 46 is set so as to reflect not only the direct light OPU incident from above but also direct light UPU incident from below, and to emit the reflected direct light OPU and direct light UPU from the plate material 31 at an angle equal to or greater than the horizontal angle. In the same manner as that of the upper prism portion 45, in order for the plurality of lower prism portions 46 to also desirably reflect the direct lights OPU and UPU respectively incident therefrom, the plurality of lower prism portions 46 are formed so that the one located on the lower side has a smaller mountain and the one located on the upper side has a larger mountain.

Another triangular prism 47 may be provided between the upper prism portion 45 and the upper end wall 32. The triangular prism 47 functions as a so-called image restoration prism. Generally, while an outside view is not expected to look like a window in the glass block, the triangular prism 47 may be provided in a gap where the second prism portions 45 and 46 are not provided when there is some demand for the triangular prism 47. The triangular prism 47 has a shape formed in a manner that the prism portion 13 is rotated 180 degrees with a cross-sectional view direction as a center axis, and a size thereof is reduced.

Even regarding the outer wall material 3 according to the third embodiment, in the same manner as that of the outer wall material 2 according to the second embodiment, the reflection surface 20 is formed by providing the coating surface PS on the outer surfaces of the end walls 12 and 32. In the outer wall material 3 according to the third embodiment, the reflection member 20 is formed not only on the end wall 12 of the first transparent member 10 but also on the end wall 32 of the second transparent member 30. The outer wall material 3 is configured so that light that is transmitted through the prism portion 13 and reaches the end wall 32 is reflected by the reflection member 20, and the reflected light is guided to the plurality of lower prism portions 46.

The outer wall material 3 described above is manufactured in the same manner as that of the second embodiment. That is, the glass material is heated and softened (a first step), and the softened glass material is molded to form the first and second bottomed containers (the first transparent member 10 and the second transparent member 30) (a second step).

In this second step, the prism portion 13 and the second prism portions 45 and 46 are formed when the first and second bottomed containers (the first transparent member 10 and the second transparent member 30) are molded. The other triangular prism 47 is also formed as necessary.

After that, the open sides of the first and second bottomed containers (the first transparent member 10 and the second transparent member 30) are combined and integrated while the temperature thereof is maintained so as not to be lowered to the temperature equal to or less than 550° C. to 600° C. which is referred to as the annealing point (a third step). At this time, hot air is sealed in the internal space IS in a sealed state.

After that, the reflection member 20 is formed by applying the white coating or the silver coating to the outer surfaces of the side walls (12 and 32) of the first and second bottomed containers (the first transparent member 10 and the second transparent member 30) that are cooled through the annealing process of obtaining the thermal stress.

Next, an operation of the outer wall material 3 according to the third embodiment will be described with reference to FIG. 6.

First, it is assumed that the direct light OP (not illustrated) whose angle with respect to the normal line N is equal to or greater than the predetermined angle θ is incident on the first transparent member 10. At this time, in the same manner as that of the first embodiment, the direct light OP1 reaches the reflection member 20 on the side of the end wall 12 and is retro-reflected.

It is assumed that the direct light OP2 whose angle with respect to the normal line N is less than the predetermined angle θ is incident on the first transparent member 10. At this time, the direct light OP2 is emitted from the prism portion 13 to the internal space IS through the plate material 11 of the first transparent member 10. A part of the light emitted to the internal space IS becomes the direct light OPU that directly reaches the upper prism portion 45 or the lower prism portion 46, is reflected by the upper prism portion 45 or the lower prism portion 46, and is emitted from the plate material 31 of the second transparent member 30 at an angle equal to or greater than the horizontal angle. A part of the light emitted to the internal space IS becomes the direct light UPU that reaches the reflection member 20 of the end wall 32 of the second transparent member 30, is reflected by the reflection member 20, and reaches the lower prism portion 46. The direct light UPU is reflected by the lower prism portion 46 and is emitted from the plate material 31 of the second transparent member 30 at an angle equal to or greater than the horizontal angle.

As a result, the outer wall material 3 can retro-reflect the direct light OP1 in the summer, and can achieve an illumination effect by using the direct light OP2 in the winter. The direct light OP2 irradiates an indoor ceiling as an electromagnetic wave, such that a heating effect can also be achieved by heating the indoor ceiling.

As described above, according to the outer wall material 3 of the third embodiment, in the same manner as that of the second embodiment, it is possible to provide the outer wall material 3 that can be switched between the state in which the direct light OP1 in the summer is retro-reflected and the state in which the direct light OP2 in the winter is not retro-reflected without requiring the user operation. For example, the reflection member 20 can be formed from the outside after the first transparent member 10 and the second transparent member 30 are joined to each other without forming the reflection member 20 in the internal space IS, thereby making it possible to easily form the reflection member 20.

According to the third embodiment, the second transparent member 30 provided on the room side of the first transparent member 10 is further provided, and the second transparent member 30 includes the second prism portions 45 and 46 that guide the light transmitted through the prism portion 13 of the first transparent member 10 to the indoor ceiling side. Therefore, the light when the sun altitude in the summer is high is retro-reflected by using the reflection member 20, and the light when the sun altitude in the winter is low can be used for illuminating the indoor ceiling by using the second prism portions 45 and 46.

According to the method for manufacturing the outer wall material 3 of the third embodiment, in the same manner as that of the second embodiment, the number of times of the annealing process that takes time is reduced, thereby making it possible to contribute to cost reduction. The internal space IS that is integrated and sealed under the high temperature environment becomes the low pressure space when the temperature thereof is lowered to the room temperature, whereby the heat insulating layer can be formed in the process of manufacturing the outer wall material 3.

Next, a fourth embodiment of the present invention will be described. While an outer wall material according to the fourth embodiment is similar to that of the first embodiment, some configurations therebetween are different. In the following description, elements that are the same as or similar to those of the first embodiment will be denoted by the same reference signs, and the description thereof will be omitted.

Figure 7:
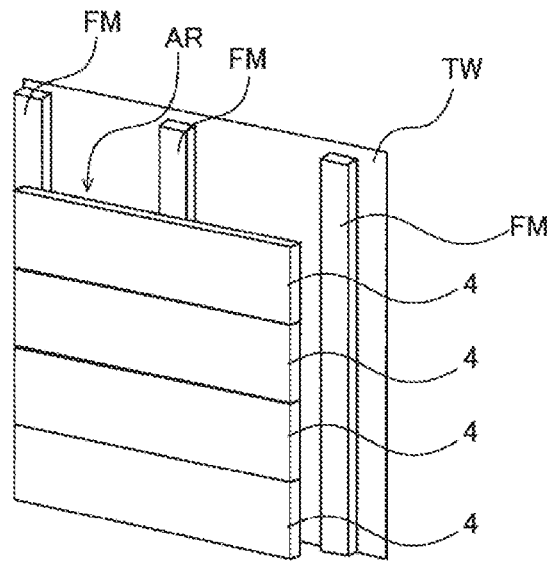
FIG. 7 is a perspective view illustrating an outer wall material according to a fourth embodiment.
Figure 8:
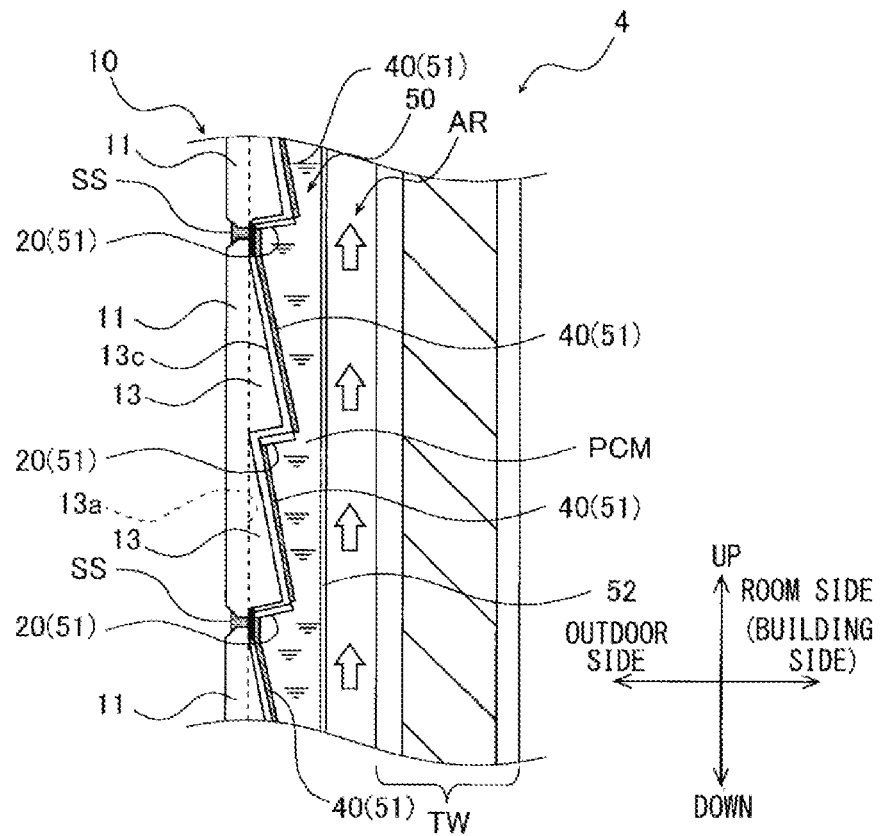
FIG. 8 is a cross-sectional view illustrating the outer wall material according to the fourth embodiment.

FIG. 7 is a perspective view illustrating the outer wall material according to the fourth embodiment, and FIG. 8 is a cross-sectional view illustrating the outer wall material according to the fourth embodiment. An outer wall material 4 illustrated in FIGS. 7 and 8 is used as a so-called siding board and is stuck to a furring material FM of a building. In the same manner as that of the first embodiment, the outer wall material 4 includes the first transparent member 10, the reflection member 20, and the heat absorbing member 40, and is configured to heat air in an air passage AR formed between the outer wall material 4 and a heat insulating wall TW of the building. The outer wall material 4 according to the fourth embodiment includes an interposing member 50.

The interposing member 50 is provided on the room side of the prism portion 13, and includes an outdoor side plate material 51 formed in a zigzag shape on the outdoor side, and a room side plate material 52 formed in a flat plate shape on the room side. The outdoor side plate material 51 formed in the zigzag shape has a shape formed along the prism portion 13 and is provided to be slightly separated from the prism portion 13. A surface of the outdoor side plate material 51 facing the second side 13b of the prism portion 13 serves as the reflection member 20 of a white color or a silver color, and a surface thereof facing the third side 13c thereof serves as the heat absorbing member 40 of a black color. The heat absorbing member 40 desirably has a sunlight selective absorption characteristic, and is desirably a dark color having a high absorptivity but is not limited to the black color. Dark orange, and green may be included in consideration of design. The room side plate material 52 is configured so that a room side surface thereof defines the air passage AR together with the heat insulating wall TW.

The interposing member 50 includes a latent heat storage material PCM between the outdoor side plate material 51 and the room side plate material 52. The latent heat storage material PCM is formed of, for example, an inorganic salt hydrate ($Na_2SO_4 10H_2O$ and $CaCl_2 6H_2O$), and has a melting point and a freezing point in a specific temperature range (for example, 21° C.).

The first transparent members 10 vertically adjacent to each other are connected to each other by a silicone sealant SS, and adhesion is performed on the room side of the silicone sealant SS by a glass adhesive (a black portion in FIG. 8).

Next, an operation of the outer wall material 4 according to the fourth embodiment will be described with reference to FIG. 8.

First, it is assumed that the direct light OP (not illustrated) whose angle with respect to the normal line of the plate material 11 is equal to or greater than a predetermined angle is incident on the first transparent member 10. At this time, the direct light OP1 reaches the reflection member 20 and is retro-reflected in the same manner as that of the first embodiment.

It is assumed that the direct light OP2 (not illustrated) whose angle with respect to the normal line is less than the predetermined angle is incident on the first transparent member 10. At this time, the direct light OP2 is transmitted through the plate material 11 of the first transparent member 10 to reach the prism portion 13, and is transmitted through the prism portion 13 to reach the heat absorbing member 40, such that heat thereof is absorbed by the heat absorbing member 40. Accordingly, the latent heat storage material PCM of the interposing member 50 is heated. Since the latent heat storage material PCM is maintained at an approximately constant temperature until the whole amount thereof is solidified or melted, the latent heat storage material PCM is maintained in a specific temperature range. When the specific temperature range is, for example, approximately 21° C., the air (cold air in the winter) in the air passage AR is heated by the interposing member 50. For example, the heated air is drawn into the room by power of a fan, and is used for heating. That is, in the winter, solar heat during the day is stored, thereby making it possible to be used for heating even at night.

Since the latent heat storage material PCM tends to maintain the specific temperature range, in the summer, the direct light OP1 is retro-reflected to prevent the air in the air passage AR from being heated, and the air in the air passage AR (warm air in the summer) is configured to be cooled by the interposing member 50. For example, the cooled air is drawn into the room by the power of the fan, and is used for cooling.

As a result, the outer wall material 4 can retro-reflect the direct light OP1 in the summer and achieve a cooling effect, and can also achieve a heating effect by using the direct light OP2 in the winter. The interposing member 50 includes the latent heat storage material PCM in the fourth embodiment, but is not limited thereto and may not include the latent heat storage material PCM.

As described above, according to the outer wall material 4 of the fourth embodiment, in the same manner as that of the first embodiment, it is possible to provide the outer wall material 4 that can be switched between the state in which the direct light OP1 in the summer is retro-reflected and the state in which the direct light OP2 in the winter is not retro-reflected without requiring the user operation.

According to the fourth embodiment, since the air in the air passage AR adjacent to the room side is heated by using the heat absorbed by the heat absorbing member 40, for example, the heated air can be used for heating by drawing the heated air in the air passage AR into the room.

In the fourth embodiment, the heat absorbing member 40 is formed on the surface of the outdoor side, and the interposing member 50 that forms the air passage AR on the surface of the room side is provided. Therefore, when the interposing member 50 is visually recognized through the first transparent member 10 including the transparent prism portion 13 and, for example, a heat insulating material is located on the room side of the air passage AR, it is possible to provide the outer wall material 4 capable of preventing the heat insulating material from being visually recognized. According to the fourth embodiment, it is possible to provide the outer wall material 4 that allows the design of the interposing member 50 to be visually recognized.

Since the interposing member 50 includes the latent heat storage material PCM, for example, the interposing member 50 can be maintained at an intermediate temperature between the summer and the winter, and the air in the air passage AR can provide a comfortable temperature. Alternatively, the temperature is set to a high value, for example, approximately 26° C. and solar heat in the winter can be used for heating at night, or the temperature is set to a low value and cold heat at night in the summer can be used for preventing excessive temperature rise during the day.

Next, a fifth embodiment of the present invention will be described. While an outer wall material according to the fifth embodiment is similar to that of the first embodiment, some configurations therebetween are different. In the following description, elements that are the same as or similar to those of the first embodiment will be denoted by the same reference signs, and the description thereof will be omitted.

Figure 9:
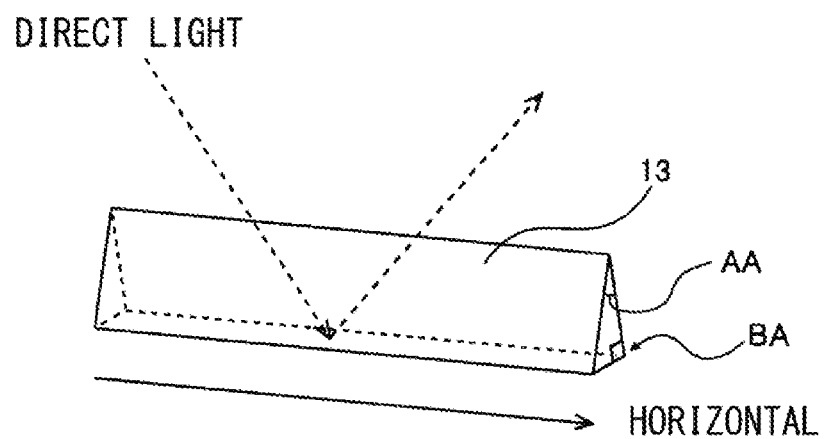
FIG. 9 is a perspective view illustrating a prism portion of the outer wall material illustrated in FIGS. 2 and 3.

First, before the outer wall material according to the fifth embodiment is described, a problem which is a premise thereof will be described. FIG. 9 is a perspective view illustrating the prism portion 13 of the outer wall material 1 illustrated in FIGS. 2 and 3. The prism portion 13 illustrated in FIG. 9 is assumed to have a south-facing upright surface. Therefore, an axial direction of the prism portion 13 is along a trajectory of the sun at the south-central time (right next to, horizontal direction), and extends horizontally.

Figure 10:
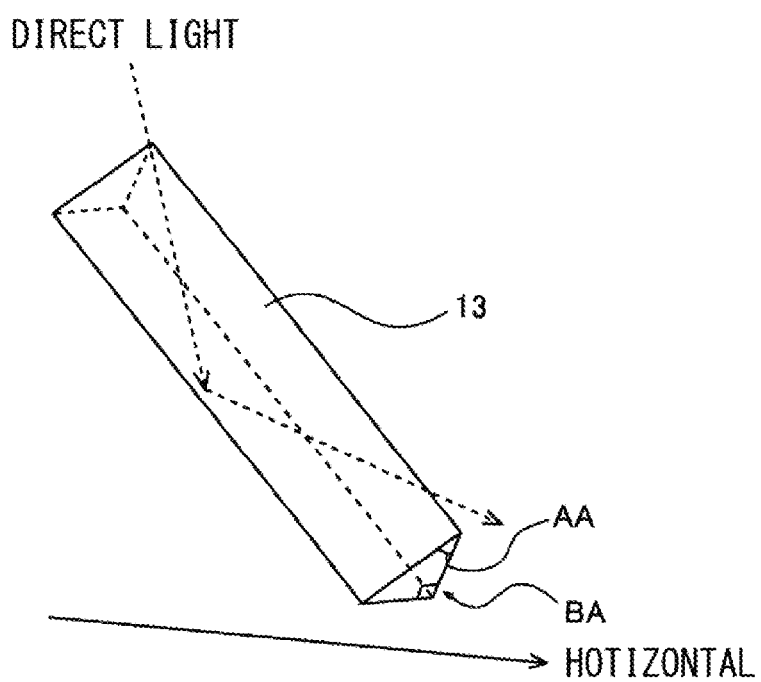
FIG. 10 is a perspective view illustrating a prism portion used for an east-facing upright surface.

FIG. 10 is a perspective view illustrating the prism portion 13 used for an east-facing upright surface. When the prism portion 13 used for the east-facing upright surface is along the trajectory of the sun, the axial direction of the prism portion 13 is inclined. Since the trajectory of the sun in due east becomes an angle of 55 degrees with respect to a horizontal plane (an angle of 35 degrees with respect to a vertical direction) at 35 degrees north latitude, the prism portion 13 is also arranged to extend at the angle of 55 degrees with respect to the horizontal plane.

Here, it is assumed that light is incident on the prism portion 13 illustrated in FIG. 9 from due south to the west side slightly. In this case, while the direct light is retro-reflected when viewed in the cross section as illustrated in FIG. 3, actually, as illustrated by a dashed arrow, the direct light is reflected to the east side slightly because the direct light is incident from the west side slightly.

On the other hand, for example, when the direct light at approximately south-central time is incident on the prism portion 13 illustrated in FIG. 10, the reflected light is directed downward from the horizontal because the prism portion 13 is inclined. When the light is reflected downward, the light heats the ground and causes a heat island phenomenon, which is not desirable. The same applies to a westward direction.

As described above, it is desirable that the prism portion 13 used for the outer wall material facing the east or the west is not the triangular prism illustrated in FIG. 10, but has a configuration in which the light is not reflected downward.

When a lower limit angle for retro-reflecting the light in the prism portion 13 illustrated in FIG. 9 is set to 58 degrees, an apex angle AA formed by the first side 13*a* and the third side 13*c* is 8 degrees, and a bottom angle BA formed by the second side 13*b* and the third side 13*c* is 90 degrees.

When the lower limit angle for retro-reflecting the light arriving from the east side in the prism portion 13 illustrated in FIG. 10 is set to 0 degree, the apex angle AA formed by the first side 13*a* and the third side 13*c* is 45 degrees, and the bottom angle BA formed by the second side 13*b* and the third side 13*c* is 90 degrees.

In consideration of the above-described reflection conditions, it is desirable to set a direction toward the east and a direction toward the west as follows.

Figure 11A:
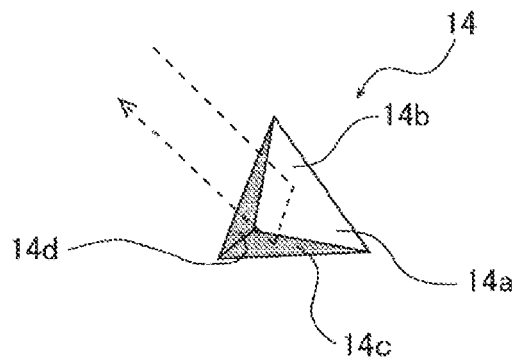
Figure 11B:
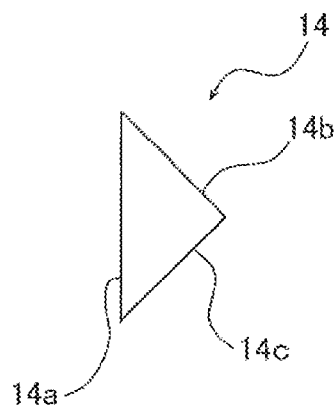

FIGS. 11A and 11B are configuration diagrams illustrating a prism portion used for the outer wall material according to the fifth embodiment. FIG. 1A illustrates a perspective view and FIG. 11B illustrates a side view. As illustrated in FIGS. 11A and 11B, a prism portion 14 used for the outer wall material according to the fifth embodiment is not the triangular prism but a triangular pyramid prism.

The prism portion 14 includes a first surface 14*a* serving as an incident surface of the direct light (a surface facing the first transparent plate material 10*a*), a second surface 14*b* connected to the first surface 14*a*, a third surface 14*c*, and a fourth surface 14*b*. The second surface 14*b*, the third surface 14*c*, and the fourth surface 14*d* are surfaces protruding from the first surface 14*a*, which is the incident surface, to the back surface side of the outer wall material, and an angle of contact therebetween is 90 degrees.

The second surface 14*b* corresponds to the third side 13*c* of the prism portion 13 which is the triangular prism, and an angle thereof is set so as to totally reflect the direct light whose angle is equal to or greater than a predetermined angle. The third surface 14*c* and the fourth surface 14*d* are processed with mirror surface treatment to form the reflection member 20.

In a case where the above-described prism portion 14 is used for the east-facing upright surface, when the direct light at the approximately south-central time is incident, for example, as illustrated in FIG. 11A, the direct light is reflected by the reflection member 20 of the third surface 14*c* after being totally reflected by the second surface 14b, and is emitted upward in the south side.

Accordingly, the prism portion 14 as illustrated in FIGS. 11A and 11B may be used for the outer wall material having the east-facing upright surface. As the outer wall material having a west-facing upright surface, a prism portion having a symmetrical structure with the prism portion illustrated in FIGS. 11A and 11B may be used.

Figure 12:
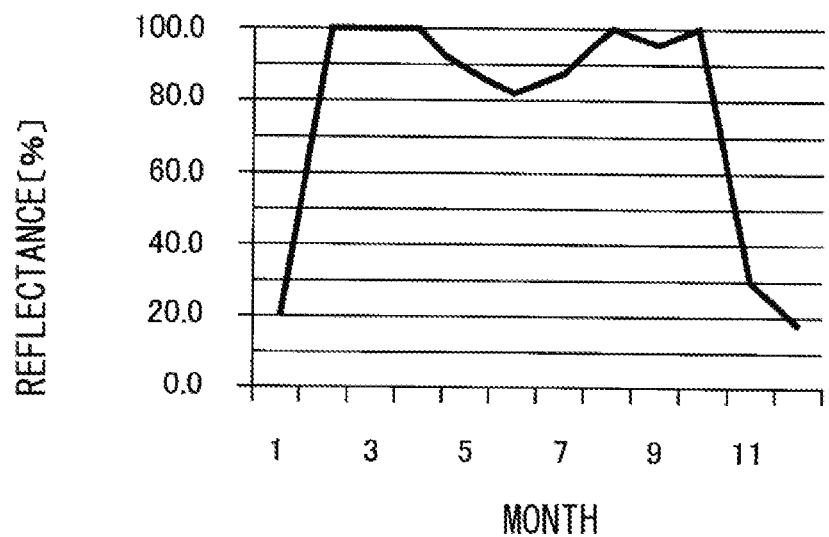
FIG. 12 is a graph illustrating reflectance of the prism portion illustrated in FIGS. 11A and 11B with respect to the direct light at 9:00 am for one year.

FIG. 12 is a graph illustrating the reflectance of the prism portion 14 illustrated in FIGS. 11A and 11B with respect to the direct light at 9:00 am for one year. In the graph illustrated in FIG. 12, the first surface 14a is assumed to face due east.

As illustrated in FIG. 12, at 9:00 am, the reflectance is maintained at 80% or more from February earlier than the spring equinox in March to October later than the autumn equinox in September. Therefore, the prism portion 14 illustrated in FIGS. 11A and 11B can reflect the direct light at the approximately south-central time to the south side, and also can retro-reflect the light from the east side from February to October including the summer.

Figure 13A:
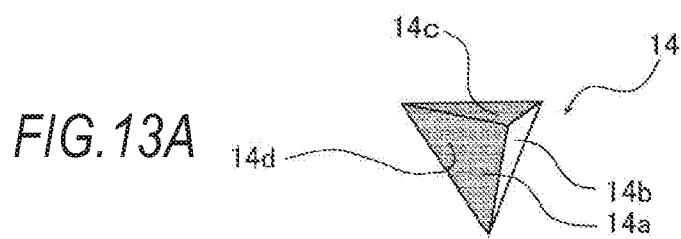
Figure 13B:
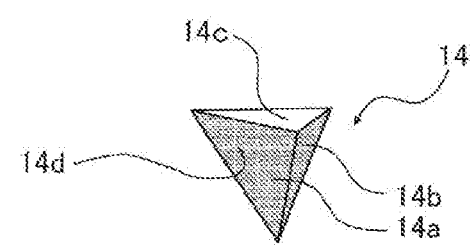
Figure 13C:
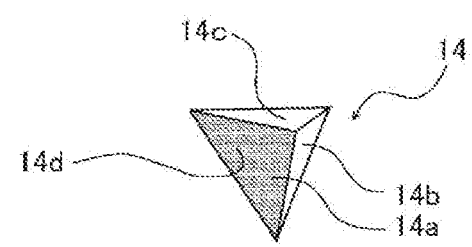

The prism portion 14 may be configured as follows depending on the application thereof. FIGS. 13A to 13C are perspective views illustrating modifications of the prism portion 14 illustrated in FIGS. 11A and 11B, in which FIG. 13A illustrates a first modification, FIG. 13B illustrates a second modification, and FIG. 13C illustrates a third modification.

In the same manner as that of the prism portion illustrated in FIGS. 11A and 11B, the prism portions 14 illustrated in FIGS. 13A to 13C include the first surface 14a serving as the incident surface of the direct light, and also includes the second surface 14b, the third surface 14c, and the fourth surface 14d which are in contact with each other at a right angle. The prism portions 14 according to the modifications have a shape obtained by vertically inverting the prism portion 14 illustrated in FIGS. 11A and 11B, such that the third surface 14c faces upward.

In the above-described modifications, the third surface 14c and the fourth surface 14d are processed with the mirror surface treatment to form the reflection member 20 in the first modification. The second surface 14b and the fourth surface 14d are processed with the mirror surface treatment to form the reflection member 20 in the second modification. Only the fourth surface 14d is processed with the mirror surface treatment to form the reflection member 20 in the third modification.

Figure 14:
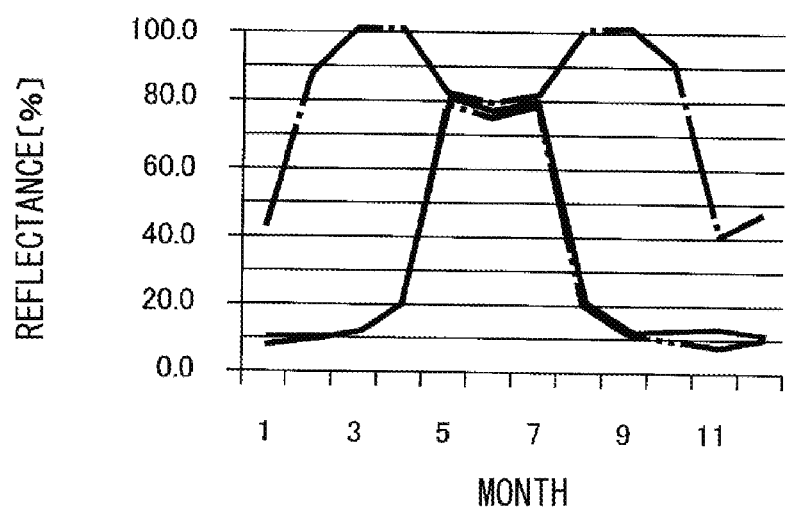
FIG. 14 is a graph illustrating reflectance of the prism portion according to the first to third modifications illustrated in FIG. 13 with respect to the direct light at 9:00 am for one year.

FIG. 14 is a graph illustrating the reflectance of the prism portions 14 according to the first to third modifications illustrated in FIGS. 13A to 13C with respect to the direct light at 9:00 am for one year. In the graph illustrated in FIG. 14, the first surface 14a is assumed to face due east. In FIG. 14, the first modification is shown by a solid line, the second modification is shown by an alternate long and short dash line, and the third modification is shown by an alternate long and two short dashes line.

As illustrated in FIG. 14, the prism portions 14 according to the first and third modifications has the reflectance of 70% or more between April and July at 9:00 am. Therefore, the prism portions 14 according to the first and third modifications can retro-reflect the light in a spot manner in the summer.

The prism portion 14 according to the second modification maintains the reflectance of 70% or more from February to October at 9:00 am. Therefore, the prism portion 14 according to the second modification can retro-reflect the light from the east side from February to October including the summer.

Figure 15:
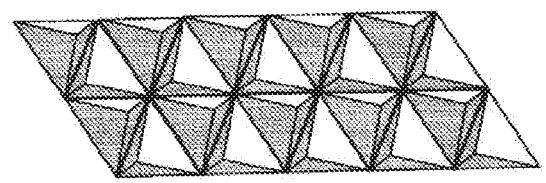
FIG. 15 is a first arrangement diagram illustrating an example of use of the prism portion.
Figure 16:
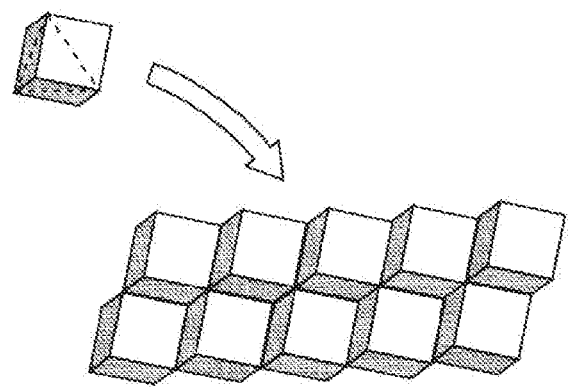
FIG. 16 is a second arrangement diagram illustrating an example of use of the prism portion.
Figure 17:
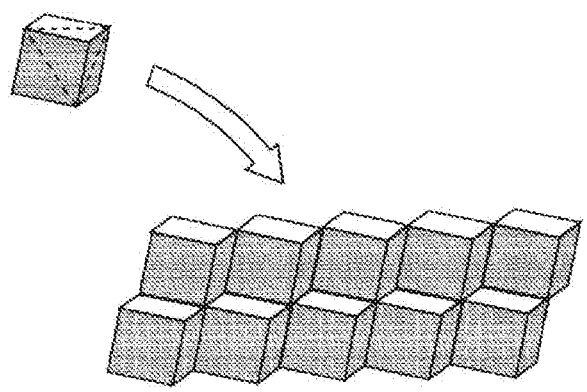
FIG. 17 is a third arrangement diagram illustrating an example of use of the prism portion.

FIGS. 15 to 17 are arrangement diagrams illustrating examples of use of the prism portion 14. As described above, since all the prism portions 14 have the triangular pyramid shape, the same shapes thereof cannot be filled without a gap. Therefore, as illustrated in FIG. 15, for example, the prism portion 14 illustrated in FIGS. 11A and 11B and the prism portion 14 illustrated in FIG. 13B are combined and filled without the gap. Accordingly, the prism portion 14 can be filled without the gap, thereby making it possible to improve reflection efficiency.

As illustrated in FIG. 16, for example, the second surface 14b to the fourth surface 14d of the prism portion 14 illustrated in FIGS. 11A and 11B may be expanded to form a quadrangle (square), and these squares may be filled without the gap. As illustrated in FIG. 17, for example, the second surface 14b to the fourth surface 14d of the prism portion 14 illustrated in FIG. 13B may be expanded to form a quadrangle (square), and these squares may be filled without the gap.

As described above, according to the outer wall material of the fifth embodiment, in the same manner as that of the first embodiment, it is possible to provide the outer wall material that can be switched between the state in which the direct light OP1 in the summer is retro-reflected and the state in which the direct light OP2 in the winter is not retro-reflected without requiring the user operation.

According to the fifth embodiment, it is possible to provide the outer wall material suitable not only for the south-facing upright surface but also for the east-facing upright surface and the west-facing upright surface.

While aspects of the present invention are described above based upon the embodiments, the present invention is not limited to the above-described embodiments.

Modifications may be added within a scope not departing from the spirit of the present invention, and technologies of the embodiments may be appropriately combined with each other within a possible scope. Further, publicly-known or well-known technologies may be combined with each other within a possible scope.

For example, while the first and second transparent members 10 and 30 are configured with solid solids (a glass material, and the like) in the above-described embodiments, the present invention is not limited thereto. The first and second transparent members may be configured with a prism wall forming an outer wall of the first and second transparent members 10 and 30, and an internal member formed of a transparent liquid sealed inside the prism wall. The internal member may be a gel and a solid.

In the above-described embodiment, while the example in which the outer wall materials 1 to 4 are used for the wall surface is described, the present invention is not limited thereto, and the outer wall materials 1 to 4 may be used as the outer wall materials 1 to 4 provided on a roof surface.

The outer wall materials 1, 2, and 4 according to the first, second, and fourth embodiments include the heat absorbing member 40, and may include, for example, a solar cell panel (a photoelectric conversion member) that generates power by using light energy instead of the heat absorbing member 40. In this case, heating can be performed by using the power obtained by the solar cell panel.

While the outer wall materials 1, 2, and 4 according to the first, second, and fourth embodiments heat the wall surface by using the heat absorbing member 40, the present invention is not limited thereto, and another member such as a heat medium may be heated to be used for heating.

While the outer wall material 2 according to the second embodiment includes the low emission portion 34 in the internal space IS, and the heat absorbing member 40 is formed on the room side surface of the second transparent member 30, the present invention is not limited thereto, and the heat absorbing member 40 may be provided at a location of the low emission portion 34 and the low emission portion 34 may not be provided. In that case, the second transparent member 30 is not necessarily required to be transparent.

While the outer wall material 3 according to the third embodiment includes the upper prism portion 45 and the lower prism portion 46, the present invention is not particularly limited thereto, and only one of the upper prism portion 45 and the lower prism portion 46 may be provided depending on a thickness of the outer wall material 3 and requirements. In addition thereto, the upper prism portion 45 and the lower prism portion 46 may not be provided, and the outer wall material 3 may function as a glass block for retro-reflection.

According to an outer wall material of the embodiments, the outer wall material includes a prism portion, and the prism portion causes a reflection member to collect light whose angle is equal to or greater than a predetermined angle and to retro-reflect the collected light, and transmits light whose angle is less than the predetermined angle. Therefore, for example, light when a sun altitude in the summer is high can be retro-reflected by using the reflection member, and light when the sun altitude in the winter is low can be transmitted to be used for heating. Therefore, it is possible to provide the outer wall material capable of being switched between a state in which direct light in the summer is retro-reflected and a state in which direct light in the winter is not retro-reflected without requiring a user operation.

According to a method for manufacturing the outer wall material of the embodiments, once a glass material exceeds an annealing point, thereafter, an operation up to integration is performed in a state of exceeding the annealing point, and thereafter, an annealing process is performed. Accordingly, the number of times of the annealing process that takes time is reduced, thereby making it possible to contribute to cost reduction.

What is claimed is:

1. A method for manufacturing an outer wall material, the method comprising:
    a first step of heating and softening a glass material;
    a second step of molding the glass material softened in the first step to form first and second bottomed containers, each of the first and second bottomed containers including a bottom wall, a side wall, and a upper portion being open;
    a third step of combining the first and second bottomed containers obtained through the second step so that the upper portions face each other; and
    a fourth step of forming a reflection member by applying a coating to an outer surface of the side wall of at least the first bottomed container of the integrated first and second bottomed containers,
    wherein in the second step, a prism portion is formed when the first bottomed container is molded, the prism portion causing the reflection member to collect light incident on the prism portion at a first angle with respect to a normal line of the bottom wall that is equal to or greater than a predetermined angle and to retro-reflect the collected light, and transmitting light incident on the prism portion at a second angle with respect to the normal line of the bottom wall that is less than the predetermined angle, and
    the first and second bottomed containers are maintained at a temperature exceeding an annealing point of the glass material in the second step and the third step, and are lowered to a room temperature between the third step and the fourth step.

2. The method for manufacturing the outer wall material, according to claim 1,
    wherein in the third step, an internal space is formed in a sealed state when the first and second bottomed containers are combined with the upper portions facing each other.

* * * * *